United States Patent [19]
Brantman et al.

[11] Patent Number: 5,924,723
[45] Date of Patent: Jul. 20, 1999

[54] SIDE SAFETY BARRIER DEVICE

[75] Inventors: Russel Brantman, Tampa; Hendrik Bernardus Helleman, Brandon; Said Shafik Nakhla, Lakeland; Michael F. Daly, Tampa; Atul N. Patel, Lakeland, all of Fla.; Jesse Livermore, Northville; Jayant Patel, Troy, both of Mich.; Stephen Smith, Dillsboro, N.C.

[73] Assignee: Breed Automotive Technology, Inc., Lakeland, Fla.

[21] Appl. No.: 08/883,999

[22] Filed: Jun. 27, 1997

[51] Int. Cl.⁶ ..................................................... B60R 21/16
[52] U.S. Cl. ............................................................. 280/730.2
[58] Field of Search ........................................... 280/730.2

[56] References Cited

U.S. PATENT DOCUMENTS

| | | | |
|---|---|---|---|
| 5,226,672 | 7/1993 | Husted | 280/749 |
| 5,232,244 | 8/1993 | Itoh | 280/749 |
| 5,238,263 | 8/1993 | Sinnhuber | 280/730 |
| 5,316,336 | 5/1994 | Taguchi et al. | 280/730.2 |
| 5,322,322 | 6/1994 | Bark et al. | 280/730 |
| 5,333,899 | 8/1994 | Witte | 280/730.2 |
| 5,348,342 | 9/1994 | Haland et al. | 280/730.2 |
| 5,356,177 | 10/1994 | Weller | 280/751 |
| 5,366,241 | 11/1994 | Kithil | 280/735 |
| 5,462,308 | 10/1995 | Seki et al. | 280/749 |
| 5,660,414 | 8/1997 | Karlow et al. | 280/749 |
| 5,788,270 | 8/1998 | HÅland | 280/730.2 |

FOREIGN PATENT DOCUMENTS

| | | |
|---|---|---|
| WO 94/19215 | 9/1994 | WIPO . |
| WO 95/12504 | 5/1995 | WIPO . |
| WO 96/26087 | 8/1996 | WIPO . |

*Primary Examiner*—Kenneth R. Rice
*Attorney, Agent, or Firm*—L. Drayer

[57] ABSTRACT

A side safety barrier device to protect occupants of a vehicle includes a crash sensor to generate at least one actuator signal when a crash having predetermined properties is sensed. A safety barrier is normally stored in the headliner of the vehicle in a first or stored position and selectively deployable to a second or deployed position by the safety barrier deployment assembly when signaled by the crash sensor to separate or isolate the side of the vehicle on which the side safety device is disposed from the interior of the vehicle.

12 Claims, 3 Drawing Sheets

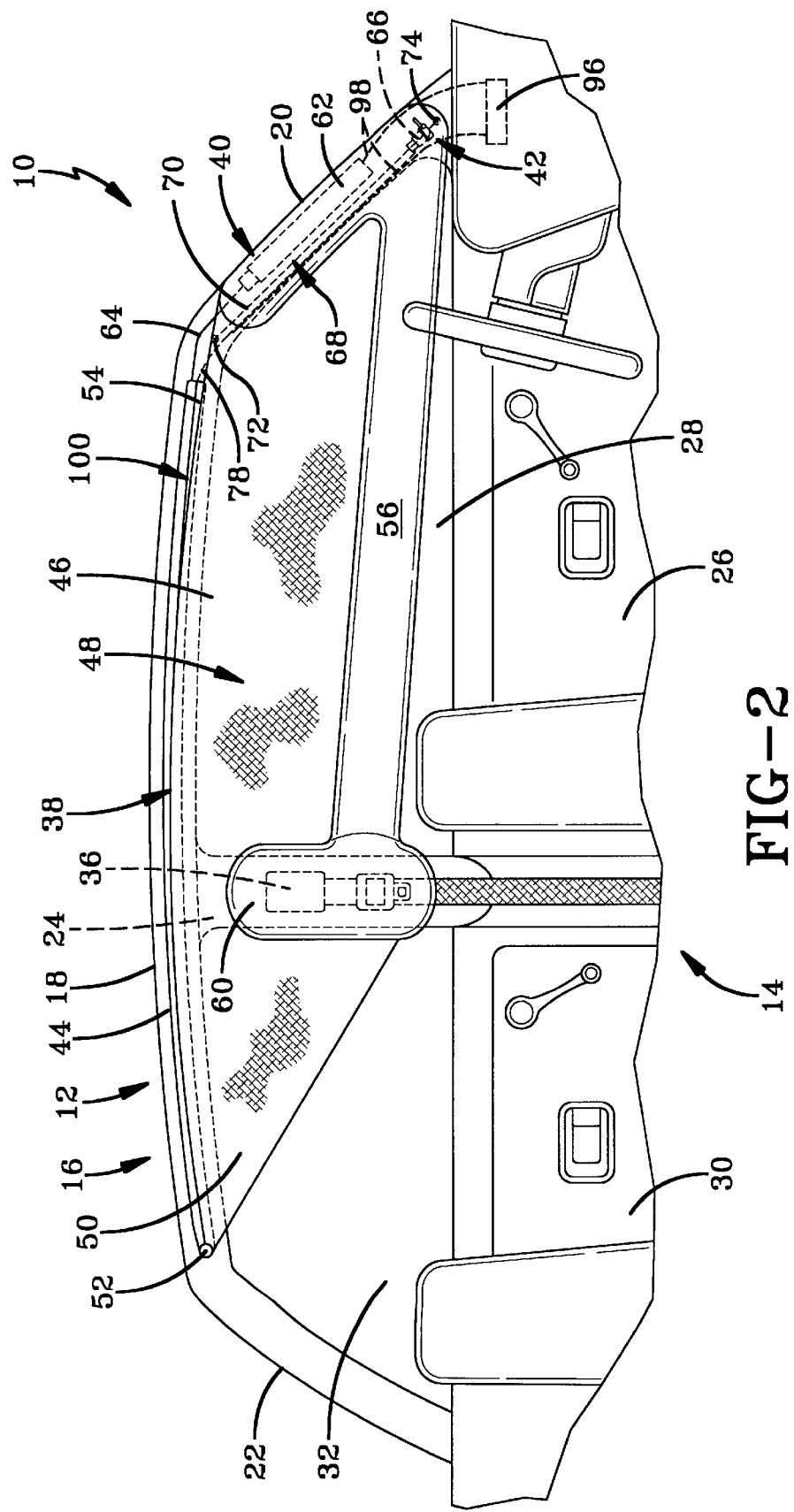

SIDE SAFETY BARRIER DEVICE

BACKGROUND OF THE INVENTION

1. Field of the Invention

The present invention relates to a side safety barrier device to protect occupants of a vehicle during a vehicle crash.

2. Description of the Prior Art

Safety devices to protect vehicle occupants in the event of side impact or oblique impact are well known in the art. Upon detection of such impacts by sensors, such safety devices are usually deployed from the door panel assembly, the headliner or a side portion a seat.

WO 96/26087 teaches a side impact safety device comprising an inflatable bladder initially stored in a door frame recess and a gas generator to inflate the inflatable bladder such that the inflatable element is inflated to extend between the head of a person sitting in the motor vehicle and a door or window.

WO 95/12504 teaches a side impact safety device comprising a cable with a fabric secured thereto anchored in the region of the roof and taken from there to a central pillar and a tension device arranged in the lower region of the central pillar to take the cable into a position at a distance from the roof and the side paneling and secure a fabric to retain the head of a passenger.

WO 94/19215 and U.S. Pat. No. 5,322,322 relate to a side impact safety device comprising (a) an inflatable bladder mounted along the periphery of a vehicle's side pillars and roof rail and (b) a gas generator. In the event of a crash a taut, semi-rigid structural member is deployed across a portion of the vehicle's side window.

U.S. Pat. No. 5,462,308 describes a side impact safety device including a membrane-like shock absorbing member stored along a roof rail. A movable pin is mounted at a lower end of the shock absorbing member and is connected through a wire to an unfolding device. A gas generator and a cylinder with a piston slidably received therein is coupled to the wire such that the gas generator forces the piston in the cylinder downwardly to deploy the shock absorbing member.

U.S. Pat. No. 5,366,241 teaches an airbag deployment system with sensors, a warning light and a warning sleeve on the steering wheel to discourage the driver from remaining in a position involving an increased risk of injury and an automatic bag release means to release the airbag and free the passenger when the collision is over.

U.S. Pat. No. 5,356,177 teaches a side impact safety device including a cushion with a hollow flexible skin having an inner wall secured to an inner panel and flexible walls between the skin and the inner wall. Some of the walls have an orifice formed therein to prevent the skin from bulging such that air contained in the cushion is adaptable to flow through inner wall orifice(s) prior to discharge through a side wall orifice when subjected to impact by the vehicle occupant in the event of a side impact.

U.S. Pat. No. 5,348,342 describes a side impact safety device including at least one airbag mounted in a vehicle seat and a sensor for initiating inflation of the airbag.

U.S. Pat. No. 5,333,899 teaches a side impact safety device including at least one airbag positioned above the lintel and at least one airbag positioned below the sill of a side window such that upon activation the facing surface areas of the airbag will be engaged to form a limitedly fixed transverse connection during the initial phase of a crash.

U.S. Pat. No. 5,316,336 relates to an airbag stored in a folded state in a space in a door or an arm rest laterally of a passenger.

U.S. Pat. No. 5,238,263 teaches an airbag for protecting a vehicle occupant from injuries due to hard parts of a vertically adjustable articulation structure for a safety harness.

U.S. Pat. No. 5,232,244 discloses a safety device including a sheet material that can move up and down adjacent the inner surface of the windshield in conjunction with a slider adapted to move up and down along a guide rail associated with the pillar wherein the slider is connected by a tension wire to a pull-down mechanism activated upon a frontal impact of the vehicle.

U.S. Pat. No. 5,226,672 relates to a safety device for an occupant seat including a net stored in a headliner above and forward of the front seat secured to cables trained along the inside of the vehicle to a pair of pistons in barrels that are located beneath the vehicle.

A common shortcoming in the prior art is the inconvenient positioning of the barriers when stored and the inability to maintain the barriers in the desired position. Further, much of the prior art fails to sufficiently anchor the safety barrier to secure the passenger within the vehicle and absorb the force of an act. Additionally, many such barriers are not suitably stored prior to deployment. Thus, there is a real need for an improvement in side impact safety assemblies. The present invention addresses these deficiencies in the prior art; while, providing for new features not available previously.

BRIEF SUMMARY OF THE INVENTION

The present invention relates to a side safety barrier device to protect occupants of a vehicle during a side impact comprising: a safety barrier, a safety barrier deployment assembly and a safety barrier securing means. As described more fully hereinafter, the safety barrier is normally stored in the headliner of the vehicle in a first or stored position and is deployable to a second or deployed position by the safety barrier deployment assembly, and secured in the second or deployed position by the safety barrier securing means.

The safety barrier comprises a shield and a cushion or inflatable bladder operatively connected to a source of inflation gas, such as a gas generator, to inflate the inflatable bladder as the safety barrier is deployed to the second or deployed position.

The barrier deployment assembly comprises a barrier positioning element slidably mounted on a positioning guide means to guide the barrier positioning element from a first or upper position to a second or lower position during deployment of the safety barrier. The barrier positioning element coupled to the safety barrier by a flexible positioning cord or element includes a chamber to house or retain a propellant therein.

The safety barrier securing means comprises a ring to receive the barrier positioning element therethrough when the safety barrier is in the second or lower position.

When the side safety barrier device is installed in the vehicle, the source of inflation gas and the propellant are operatively connected to a sensor means by conductors to selectively feed actuator or enabling signals thereto.

The sensor means comprises an accelerometer and/or impact sensor and/or rollover sensor and logic of the kind ordinarily used in the art to detect the occurrence of a crash with properties which justify the actuation of the side safety barrier device and timing logic of the kind ordinarily used in the art to sequence the timing of the actuator or enabling signals including a barrier deployment signal and a bladder inflation signal to deploy the safety barrier.

The safety barrier is normally stored within a headliner that includes a slit or perforated line. When the sensor means detects a crash sufficient to deploy the safety barrier, the barrier deployment signal and the bladder inflation signal are generated and fed to the propellant and the source of inflation gas respectively through the conductors. The propellant is ignited and imparts a force on the barrier positioning element to move the barrier positioning element along the positioning guide means to and at least partially through the safety barrier securing means. As the barrier positioning element moves from the stored position to the deployed position, the barrier positioning element pulls the flexible positioning cord or element which, in turn, imparts a force upon the safety barrier sufficient to break through the slit or perforations in the headliner and move the safety barrier from the stored position to the deployed position. Simultaneously, the source of inflation gas inflates the inflatable bladder as the safety barrier is deployed.

Other advantages, features and objectives will be found throughout the following description, claims and accompanying drawings.

BRIEF DESCRIPTION OF THE DRAWINGS

For a fuller understanding of the nature and object of the invention, reference should be made to the following detailed description taken in connection with the accompanying drawings in which:

FIG. 2 is similar to FIG. 1 with the safety barrier in the deployed position.

DETAILED DESCRIPTION OF THE PREFERRED EMBODIMENT

Figure 1:
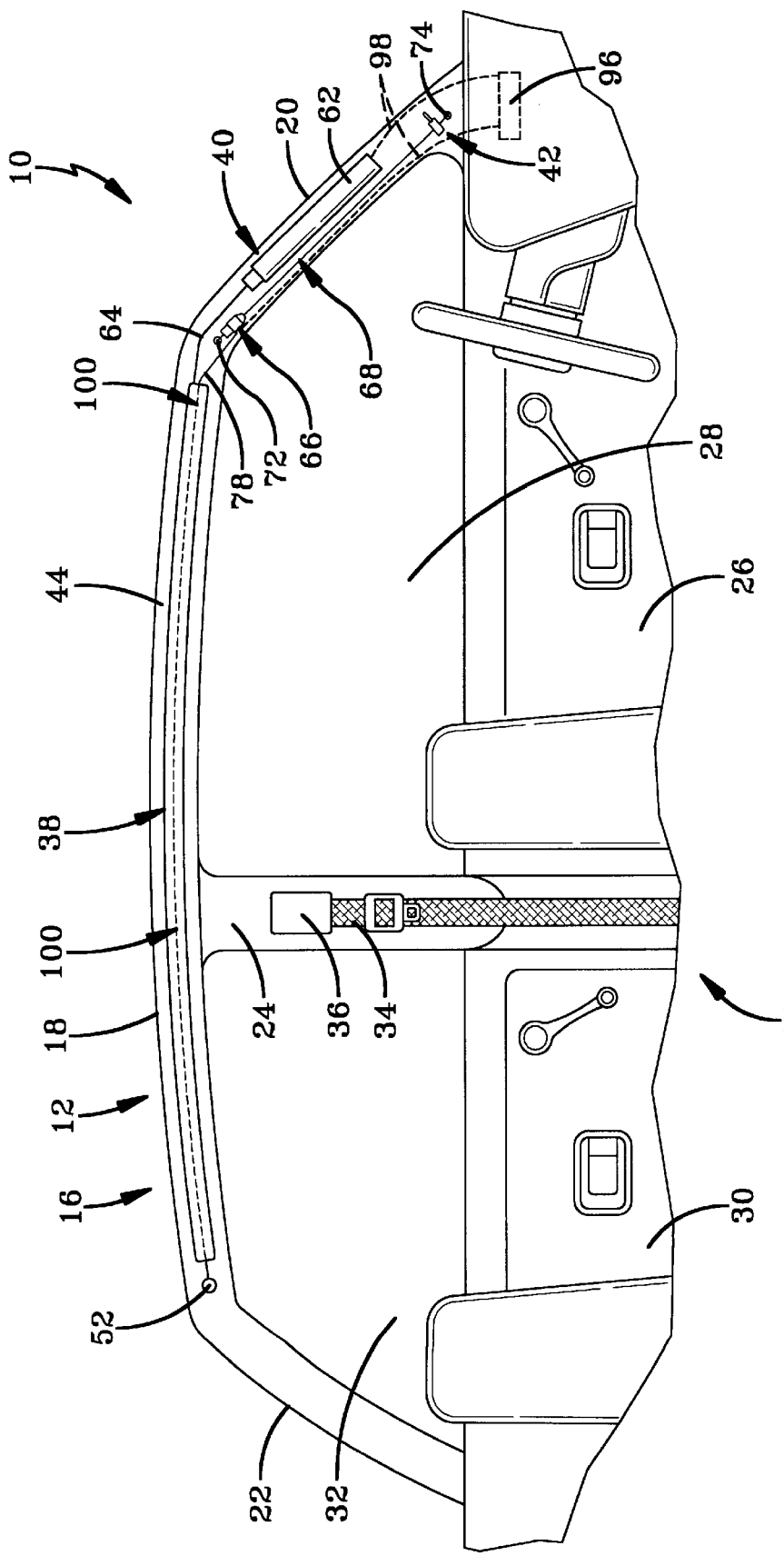
FIG. 1 is a view of the interior of the driver's side of a vehicle and the side safety barrier device of the present invention with the safety barrier in the stored position.

The present invention relates to a side safety barrier device generally, indicated as 10, to protect occupants of a vehicle, generally indicated as 12, during a vehicle crash. As used herein and in the claims a "crash" is understood to refer to any event in which a vehicle or vehicle occupant is subjected to forces of sufficient magnitude to require the deployment of an airbag or seat belt pretensioner in accordance with government regulations or industry standards including frontal impact, side impact, oblique impact and vehicle rollover. As shown in FIGS. 1 and 2, the side safety barrier device 10 is operatively mounted to the interior of the vehicle 12 on the driver's side 14. Of course, a similar side safety barrier device 10 may also be operatively mounted to the interior of the vehicle 12 on the passenger's side. The driver's side wall, generally indicated as 16, comprises a roof rail 18 extending between a forward pillar 20 and a rear pillar 22 with a central pillar 24 disposed therebetween and a front driver's side door 26 with a corresponding front window 28 and a rear driver's side door 30 with a corresponding rear window 32 operatively mounted thereon. A driver's side seat belt 34 may be operatively attached to the central pillar 24 by a seat belt attachment 36.

As used herein and in the claims, terms such as "forward", "rear", "front" and "back" are understood to refer to positions relative to the direction of forward travel of the vehicle. While the side safety barrier device is shown as installed in a four-door vehicle it will be apparent to those skilled in the art that the side safety barrier device can also be installed and operated with other vehicle body types such as a two-door vehicle.

As best shown in FIGS. 1 and 2, the side safety barrier device 10 comprises a safety barrier, a safety barrier deployment assembly and a safety barrier securing means generally indicated as 38, 40 and 42 respectively. As described more fully hereinafter, the safety barrier is 38 normally stored in the headliner 44 of the vehicle 12 in a first or stored position as shown in FIG. 1 is selectively deployable to a second or deployed position as shown in FIG. 2 by the safety barrier deployment assembly 40 and secured in the second or deployed position by the safety barrier securing means 42.

As best shown in FIG. 2, the safety barrier 38 comprises a shield 46 and a cushion generally indicated as 48. The shield 46 may be comprised of a flexible material such as a film, fabric or mesh. The rear portion 50 of the shield 46 is affixed to the roof rail 18 adjacent the rear pillar 22 by an attachment means 52; while, the forward portion 54 of the shield 46 is coupled to the safety barrier deployment assembly 40 as described more fully hereinafter. The cushion 48 comprises an inflatable bladder including an inclined center section 56 sloping upwardly from front to back and extending between a generally diagonally disposed forward section 58 and a generally vertically disposed rear section 60 operatively connected to a means of inflating the inflatable bladder, which includes a source of inflation gas 62, by a gas supply conduit 64 to inflate the inflatable bladder as the safety barrier 38 is deployed to the second or deployed position as described more fully hereinafter. As will be understood by those skilled in the art, the source of inflation gas may be a gas generator which generates gas by pyrotechnic means, or a container of stored gas, or a hybrid combination thereof. As depicted, when fully deployed, the generally diagonally disposed forward section 58 and the generally vertically disposed rear section 60 are positioned between the vehicle occupant (not shown) and the forward pillar 20 and the central pillar 24 respectively; while, the center section 56 is positioned between the head and shoulders of the vehicle occupant (not shown) and the front side window 28.

Figure 4:
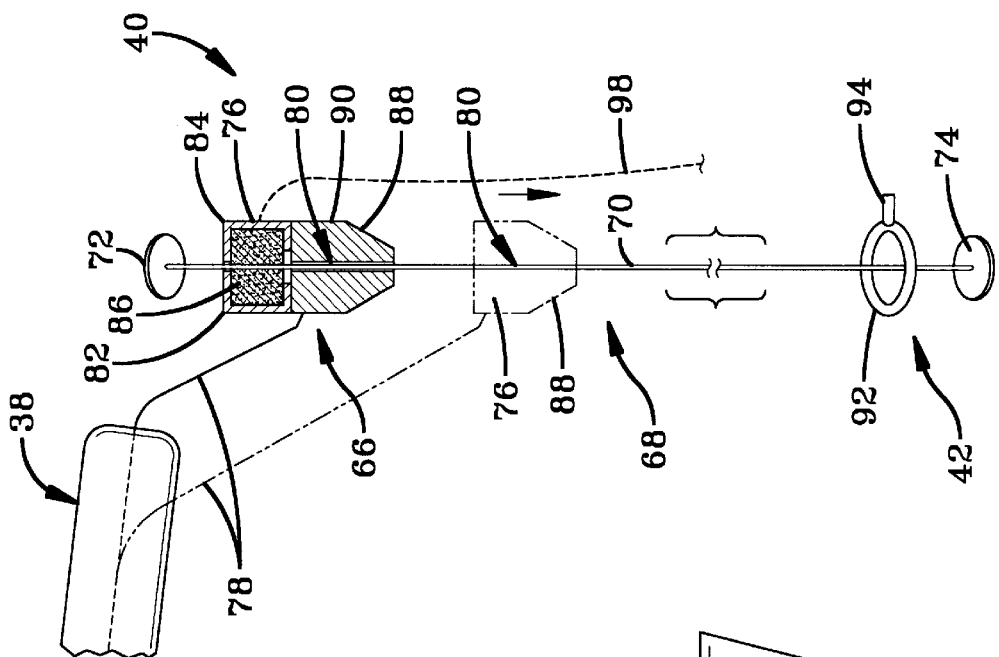
FIG. 4 is a schematic view of the safety barrier deployment assembly and the safety barrier securing means of the present invention.
Figure 3:
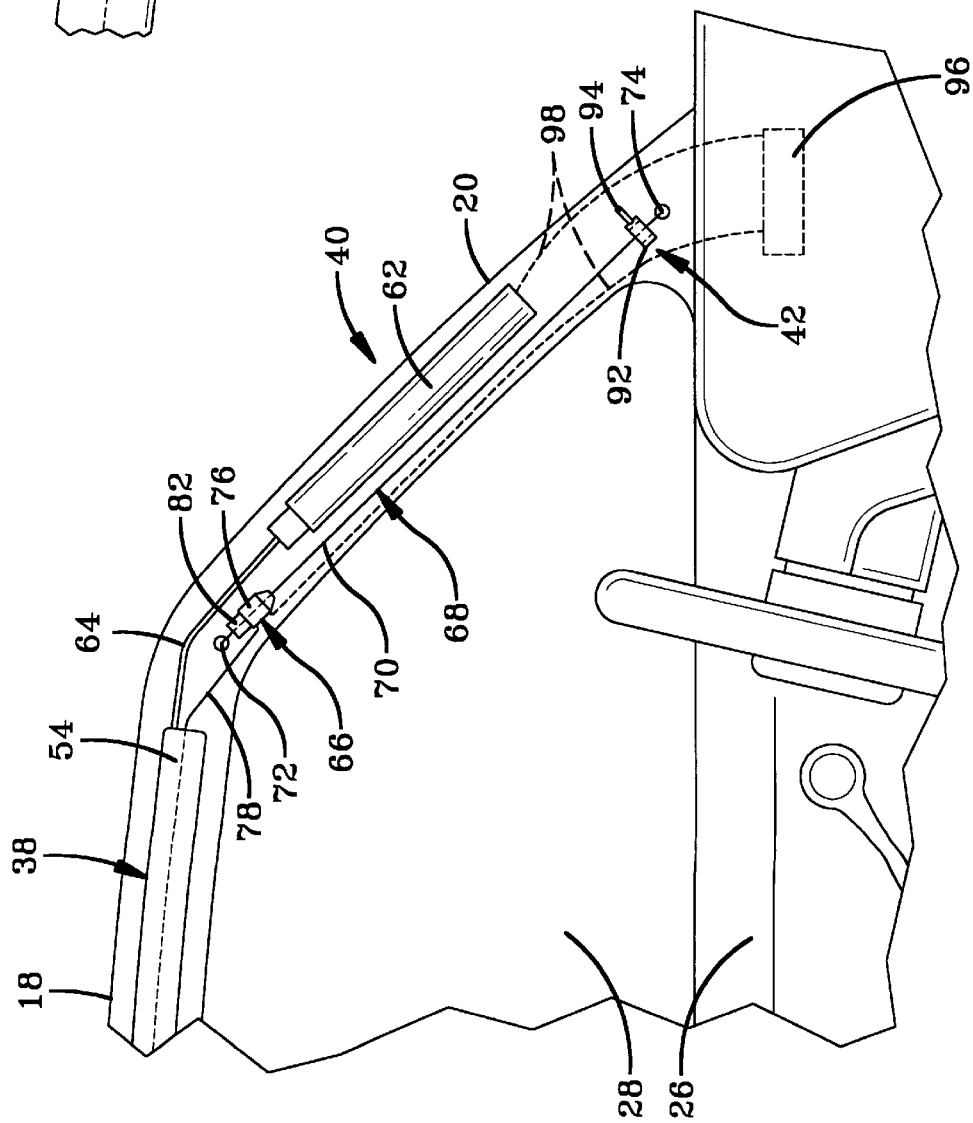
FIG. 3 is similar to FIG. 1 with a portion of the vehicle's interior broken away to show a detailed view of the safety barrier deployment assembly of the present invention with the safety barrier in the stored position.

As best shown in FIGS. 3 and 4, the barrier deployment assembly 40 comprises a barrier positioning element 66 slidably mounted on a positioning guide means 68 to guide the barrier positioning element 66 from a first or upper position as shown in FIGS. 1 and 3 to a second or lower position as shown in FIG. 2 to deploy the safety barrier 38 as shown in FIG. 2. The positioning guide means 68 comprises a guide wire or element 70 mounted to the forward pillar 20 by an upper mounting means 72 and a lower mounting means 74. The lower mounting means 74 may also cushion the impact of the barrier positioning element 66 as the safety barrier 38 is deployed. The barrier positioning element 66 comprises a substantially cylindrical member 76 coupled to the forward position 54 of the safety barrier 38 by a flexible positioning cord or element 78 having a centrally disposed channel 80 formed therethrough to operatively receive the guide wire or element 70 therein and means to move to the barrier positioning element 66 from the first or upper position to the second or lower position. For example, the means to move the barrier positioning element 66 may comprise a chamber 82 formed in the rear position 84 thereof to house or retain a propellant 86 therein. Alternatively, the means to move the barrier positioning element 66 may comprise a spring or suitable energy source. A tapered or inclined surface 88 is formed on the front portion 90 of the substantially cylindrical member 76 to operatively align and position the barrier positioning element 66 relative to the safety barrier securing means 42 as the safety barrier 38 is deployed from the first or stored position to the secured or deployed position as described more fully hereinafter.

As best shown in FIGS. 3 and 4, the safety barrier securing means 42 comprises an annular ring 92 affixed to the forward pillar 20 by a mounting member 94 extending outwardly from the annular ring 92. The diameter of the opening in the annular ring 92 may be slightly less than the outside diameter of the substantially cylindrical member 76 such that the tapered surface 88 will direct or guide the barrier positioning element 66 at least partially through the annular ring 92 under the force of the propellant 86. The barrier positioning element 66 may be produced from malleable metal, hard rubber or other compressible material to facilitate passage of the barrier positioning element at least partially through the annular ring 92.

Those skilled in the art will recognize that the barrier positioning element 66 need not be of circular cross-section and that the ring 92 need not be of circular shape so long as the shape of the cross-section of the barrier positioning element 66 is cooperatively configured with the shape of the ring 92 to permit the barrier positioning element 66 to at least partially pass through the ring 92.

The sensor means 96 comprises a crash sensor, such as an accelerometer, impact sensor or rollover sensor and logic of the kind ordinarily used in the art to detect the occurrence of a crash sufficient to justify the actuation of the side safety barrier device 10 and timing logic of the kind ordinarily used in the art to sequence the actuator or enabling signals including a barrier deployment signal and a bladder inflation signal calculated for effective deployment of the safety barrier 38. It is understood that in accordance with accepted practices in the vehicle occupant restraint field, the signals from the sensor means may be transmitted to a controller which processes said signals to determine what vehicle occupant safety devices will be actuated under the parameters of the actuation.

When the side safety barrier device 10 is installed in the vehicle 12, the means 62 of inflating the inflatable bladder and the propellant 86 are operatively connected to a sensor means 96 by conductors 98 to selectively feed actuator or enabling signals to the inflation means 62 and the propellant 86 or means to move the barrier positioning element 66.

In operation, the safety barrier 38 is normally stored, as shown in FIG. 1, within the headliner 44 that includes a slit or perforated line 100. When the sensor means 96 detects a crash having properties which require deployment of the safety barrier 38, the barrier deployment and bladder inflation signals are generated and transmitted to the propellant 86 and the source of inflation gas 62 respectively through conductors 98. The propellant 86 is ignited and imparts a force on the barrier positioning element 66 sufficient to move the barrier positioning element 66 along the positioning guide means 68 toward and at least partially through the safety barrier securing means 42 engaging the lower mounting means 74. As the barrier positioning element 66 moves from the stored position to the deployed position, the barrier positioning element 66 pulls on the flexible positioning cord or element 78 which, in turn, pulls the safety barrier 38 to break through the slit or perforations 100 of the headliner 44 and move the safety barrier 38 from the stored position to the deployed position. At the same time, the source of inflation gas 62 inflates the inflatable bladder as the safety barrier 38 is deployed. Thus, the safety barrier 38 when fully deployed is secured along the roof rail 18 or roof between the attachment means 52 and the safety barrier securing means 42 to effectively protect the vehicle occupant (not shown) during a crash such as a side impact or rollover.

As will be apparent to a person or ordinary skill in the art, the side safety barrier device 10 described herein can be modified to similarly protect the rear window 32 area.

It will thus be seen that the objects set forth above, and those made apparent from the preceding description are efficiently and cost-effectively attained and since certain changes may be made in the invention, it is intended that all matter contained in the above description or shown in the accompanying drawings shall be interpreted as illustrative and not in a limiting sense. It is also to be understood that the following claims are intended to cover all of the generic and specific features of the invention which as a matter of language might be said to fall therebetween.

We claim:

1. A side safety barrier device to protect an occupant of a vehicle during a crash wherein the vehicle has a vehicle side wall having a window area formed in part between a first pillar and a roof rail, said side safety barrier device comprising:

a means for detecting and signaling the occurrence of a crash with predetermined properties;

a safety barrier coupled to the roof rail and selectively movable between a normally stored configuration and a deployed position, said safety barrier being stored in a headliner near the roof rail with perforations extending through said headliner such that the headliner breaks open to release the safety barrier when the side safety barrier device is deployed;

a barrier deployment assembly attached to the first pillar to move said safety barrier from said normally stored position to said deployed position to separate the side of the vehicle on which the side safety barrier device is disposed from the interior of the vehicle when a crash has been detected and signaled, said barrier deployment assembly comprising a barrier positioning element that is a member coupled to said safety barrier by a flexible positioning element having a centrally disposed channel formed therethrough to operatively receive the guide element and means coupled to said means for detecting and signaling to move said barrier positioning element from said first position to said second position when a side impact has been detected and signaled coupled to said safety barrier and slidably mounted on a positioning guide means that is a guide element with a tapered surface formed on the front portion thereof mounted to the first pillar for guiding said barrier positioning element from a first position to a second position to move said safety barrier from said normally stored position to said deployed position; and, a safety barrier securing means that is a ring affixed to the first pillar by a mounting member extending outwardly from said ring for securing a portion of the safety barrier in said second position, the inside diameter of said ring being be slightly less than the outside diameter of said member such that said tapered surface will direct or guide the barrier positioning element through the ring under the force of the propellant.

2. The side safety barrier device of claim 1, wherein said safety barrier comprises a flexible shield.

3. The side safety barrier device of claim 2, wherein said safety barrier further comprises a cushion.

4. The side safety barrier device of claim 3, wherein said cushion is an inflatable bladder operatively coupled to a means to inflate said inflatable bladder, and wherein said means to inflate is operatively coupled to said means to detect and signal a side impact.

5. The side safety barrier device of claim 4, wherein said cushion comprises a center section that when said side safety barrier device is deployed is positioned between the occupant and the central portion of the window.

6. The side safety barrier device of claim 5, wherein said center section is inclined upwardly from the front to the back of the vehicle.

7. The side safety barrier device of claim 5, wherein said cushion further comprises a generally diagonally disposed section that when said side safety barrier device is deployed is positioned between the occupant and the first pillar.

8. The side safety barrier device of claim 5, wherein the vehicle side wall further includes a central pillar and wherein said cushion further comprises a generally vertically disposed section that when said side safety barrier device is deployed is positioned between the passenger and the central pillar.

9. The side safety barrier device of claim 1, wherein the means to move said barrier positioning element comprises a chamber formed in the rear position thereof and a propellant stored within said chamber.

10. The side safety barrier device of claim 1, wherein said side safety barrier device further comprises a safety barrier securing means for securing a portion of the safety barrier in said second position.

11. The side safety barrier device of claim 1 wherein said barrier positioning element comprises a malleable metal.

12. The side safety barrier device of claim 1 wherein said barrier positioning element comprises hard rubber.

* * * * *